United States Patent [19]

Nakayashiki et al.

[11] Patent Number: 4,506,357
[45] Date of Patent: Mar. 19, 1985

[54] METHOD AND APPARATUS FOR SWITCHING LOOP TYPE TRANSMISSION LINES

[75] Inventors: Susumu Nakayashiki, Yokohama; Masahiko Kida, Hadano; Toyokazu Hashimoto, Kanagawa, all of Japan

[73] Assignee: Hitachi, Ltd., Tokyo, Japan

[21] Appl. No.: 359,709

[22] Filed: Mar. 19, 1982

[30] Foreign Application Priority Data

Mar. 25, 1981 [JP] Japan .................................. 56-42321

[51] Int. Cl.$^3$ ............................................. H04J 3/14
[52] U.S. Cl. .................................................... 370/16
[58] Field of Search ................................. 370/16, 88; 179/175.3 S

[56] References Cited

U.S. PATENT DOCUMENTS

| 3,652,798 | 3/1972 | McNeilly et al. | 370/88 |
| 3,859,468 | 1/1975 | Smith et al. | 370/88 |
| 4,009,469 | 2/1977 | Boudreau et al. | 370/16 |
| 4,119,815 | 10/1978 | Frankfort et al. | 179/175.3 S |
| 4,159,470 | 6/1979 | Strojny et al. | 179/175.3 S |
| 4,190,821 | 2/1980 | Woodward | 370/16 |
| 4,347,605 | 8/1982 | Hashizume et al. | 370/88 |
| 4,370,744 | 1/1983 | Hirano et al. | 370/16 |

FOREIGN PATENT DOCUMENTS

| 1911083 | 10/1979 | Fed. Rep. of Germany | 370/16 |
| 68046 | 6/1978 | Japan | 370/88 |
| 43044 | 4/1981 | Japan | 370/88 |
| 75747 | 6/1981 | Japan | 370/88 |

Primary Examiner—Douglas W. Olms
Assistant Examiner—Wellington Chin
Attorney, Agent, or Firm—Antonelli, Terry & Wands

[57] ABSTRACT

A method of switching transmission lines for a transmission control system in which a plurality of stations are linked with loop type transmission lines having a stand-by transmission line characterized in that each of the stations is operable to switch the active transmission line to the stand-by transmission line in response to the detection of abnormality in the carrier wave and a station transmitting the carrier wave is operable to halt the transmission of the carrier wave on the active transmission line so that the overall transmission line is switched to the stand-by transmission line, thereby minimizing the system down time.

6 Claims, 5 Drawing Figures

F I G. 4
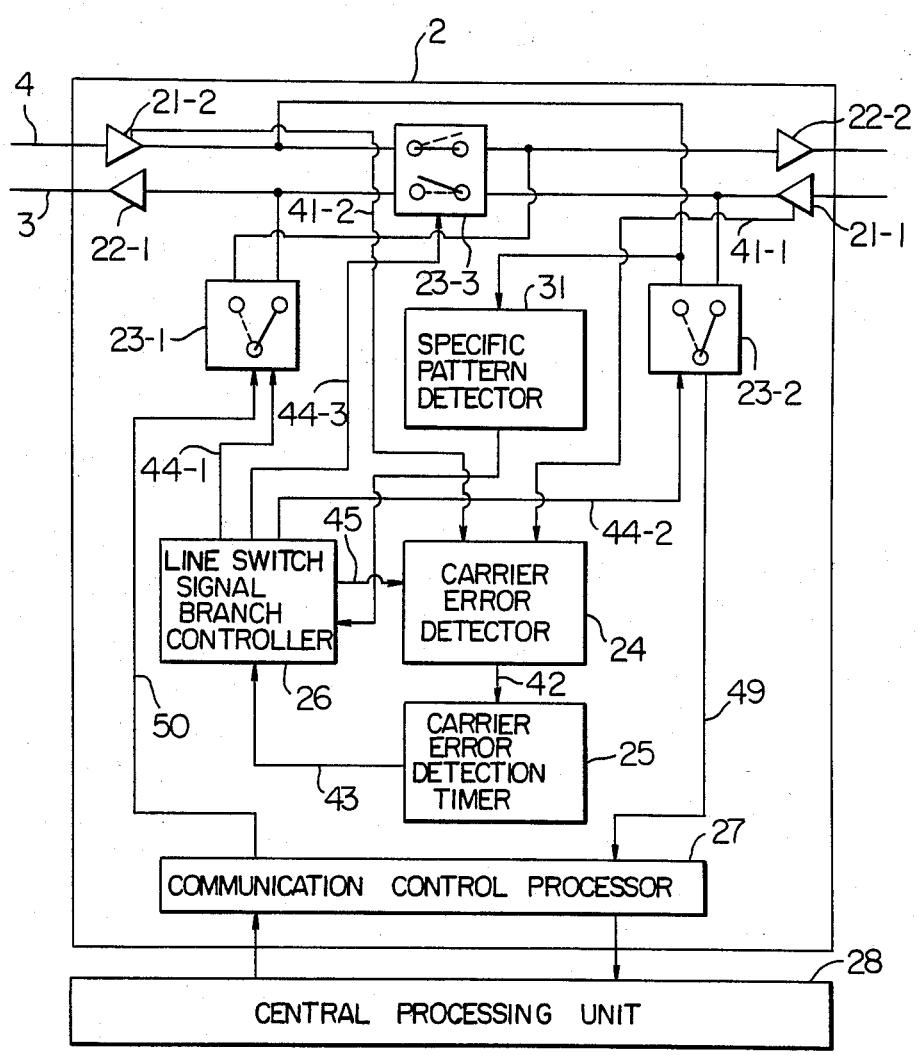

METHOD AND APPARATUS FOR SWITCHING LOOP TYPE TRANSMISSION LINES

BACKGROUND OF THE INVENTION

The present invention relates to a method and apparatus for switching loop type transmission lines.

It is well known in two-station communication that the system is arranged such that the active line is switched to the stand-by line upon occurrence of abnormality in the transmission line.

It is also known that the above-mentioned method of switching the active line to the stand-by line can be applied also to multi-station communication using a loop type transmission line.

However, the conventional method does not carry out the switching for the overall transmission line, and there has not been realized a method which carries out the switching smoothly.

SUMMARY OF THE INVENTION

It is an object of the present invention to provide a method and apparatus for switching transmission lines so that the overall loop type transmission line can be switched smoothly.

In order to achieve the above object, the present invention is characterized in that each of a plurality of terminal stations detects the abnormality in the carrier input through the active line and switches the active line to a stand-by line in response to the detection of the abnormality and at the same time the master station halts the transmission of the carrier on the active line.

BRIEF DESCRIPTION OF THE DRAWINGS

FIG. 4 is a diagram showing another embodiment of the particular arrangement of the slave station shown in FIG. 1.

DESCRIPTION OF THE PREFERRED EMBODIMENTS

Figure 1:
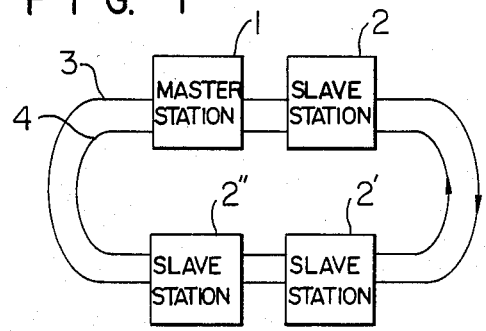
FIG. 1 is a systematic block diagram of the transmission control system for the present invention.

FIG. 1 shows a transmission control system for the present invention in which there are included a master station 1 capable of transmitting the carrier wave, slave stations 2, 2' and 2'', an active line 3, and a stand-by line 4. There exists only one master station 1 in the transmission line. The stand-by line 4 normally circulates simply modulated data.

Figure 2:
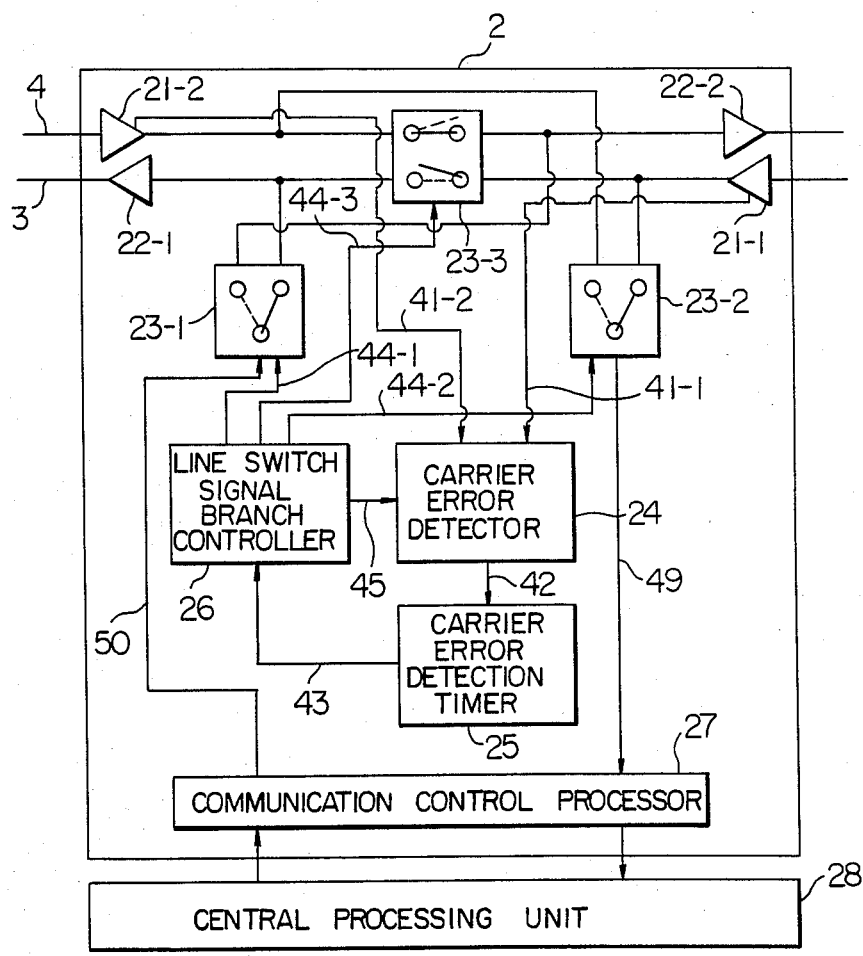
FIG. 2 is a diagram showing an embodiment of the particular arrangement of the slave station shown in FIG. 1.

FIG. 2 shows illustratively an arrangement of the slave station 2, including a demodulating circuit 21, a modulating circuit 22, an active line selection switch 23, a carrier error detector 24, a carrier error detection timer 25, a line switch signal branch controller 26, a communication control processor 27, and a central processing unit 28.

Figure 3:
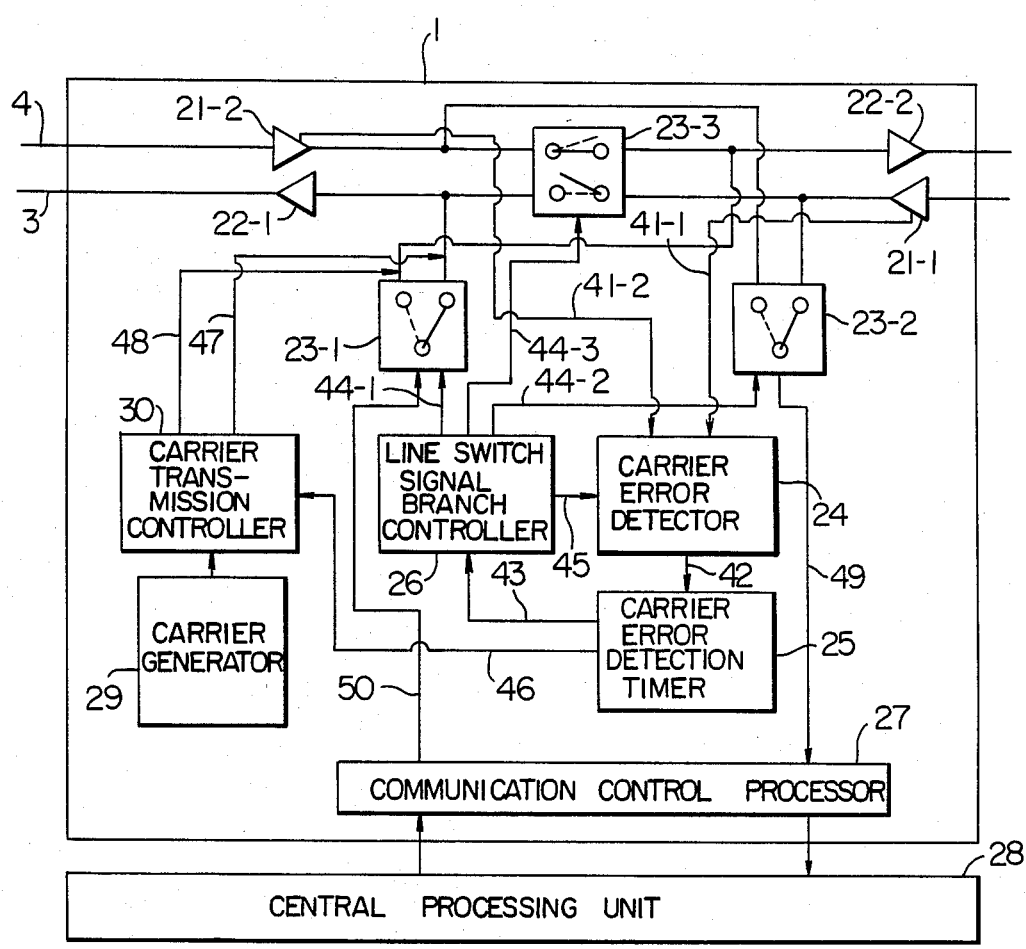
FIG. 3 is a diagram showing an embodiment of the particular arrangement of the master station shown in FIG. 1.

FIG. 3 shows an arrangement of the master station 1, including a carrier generator 29 and a carrier transmission controller 30.

In the present invention, the carrier signifies the clock signal which provides a time base for transmitting information.

The check (synchronizing) signal of the loop type transmission line according to the present invention normally is circulated; otherwise without circulation of the clock signal, the following problems will arise.

1. It takes a long time to establish synchronization in each station. When the clock signal is provided only during transmission, it takes a long time to establish synchronization in the transmitting station, receiving station and repeater station, resulting in a low efficiency of operation.

2. Each station is required to have a capability of clock generation.

By the above reason it is desirable for the loop type transmission line to be provided with the clock signal normally. The method of providing the clock signal only during transmission raises a competitive problem among stations, making the processing much more complicated. The check signal of the communication system using a loop type transmission line generally is normally circulated.

The following describes the switching of the transmission line in the case where a loop fault has occurred between the stations 2 and 2', for example, on the active line 3.

In the slave stations 2' and 2'', the carrier signal received by the demodulating circuit 21-1 is conducted through the signal line 41-1 to the carrier error detector 24 so that the error is detected by the detector 24. When the detector 24 detects a carrier error, it is indicated through the signal line 42 to the carrier error detection timer 25. The carrier error detection timer 25 checks the duration of the carrier error, and when the duration of the error exceeds the allowable time, this condition is indicated through the signal line 43 to the line switch signal branch controller 26. In response to the switching command, the line switch signal branch controller 26 carries out the switching for the active line selection switches 23-1, 23-2 and 23-3. Thus, the transmission line is switched from the active line 3 to the stand-by line 4. At the same time the controller 26 sends a signal through the signal line 45 to the detector 24 so that it receives the carrier signal through the stand-by line 4.

On the other hand, the master station 1 shown in FIG. 3 makes a switching from the active line to the stand-by line in the same way as mentioned above. At the same time the carrier error detection timer 25 directs the carrier transmission controller 30 through the signal line 46 to halt the transmission of the carrier to the active line 3. Consequently, the carrier transmission controller 30 halts the transmission of the carrier from the carrier generator 29 to the signal line 47, while the carrier to the signal line 48 is kept transmitted.

In case the signal transmission is carried out through the active line 3, the signal received by the demodulating circuit 21-1 is fed to the communication control processor 27 through the selection switch 23-2 and the signal line 49 so that data necessary for this station is fetched for the central processing unit 28. Data originated from the central processing unit 28 and incoming data which has not been taken by the unit 28 are transmitted through the communication control processor 27, signal line 50, selection switch 23-1 and modulating circuit 22-1 over the transmission line. At this time the signal on the stand-by line 4 is circulated through the demodulating circuit 21-2, selection switch 23-3 and modulating circuit 22-2.

Upon occurrence of a line fault which causes a carrier error, the selection switches 23-1, 23-2 and 23-3 are switched thereby to deliver data on the stand-by line 4 through the demodulating circuit 21-2, selection switch 23-2, signal line 40 and communication control processor 27 to the central processing unit 28, and to transmit data from the central processing unit 28 through the communication control processor 27, signal line 50, selection switch 23-1 and modulating circuit 22-2 over the stand-by line 4.

As can be seen from the above description, when a failure occurs on the active line 3, the transmission line can be switched to the stand-by line 4 smoothly.

Figure 5:
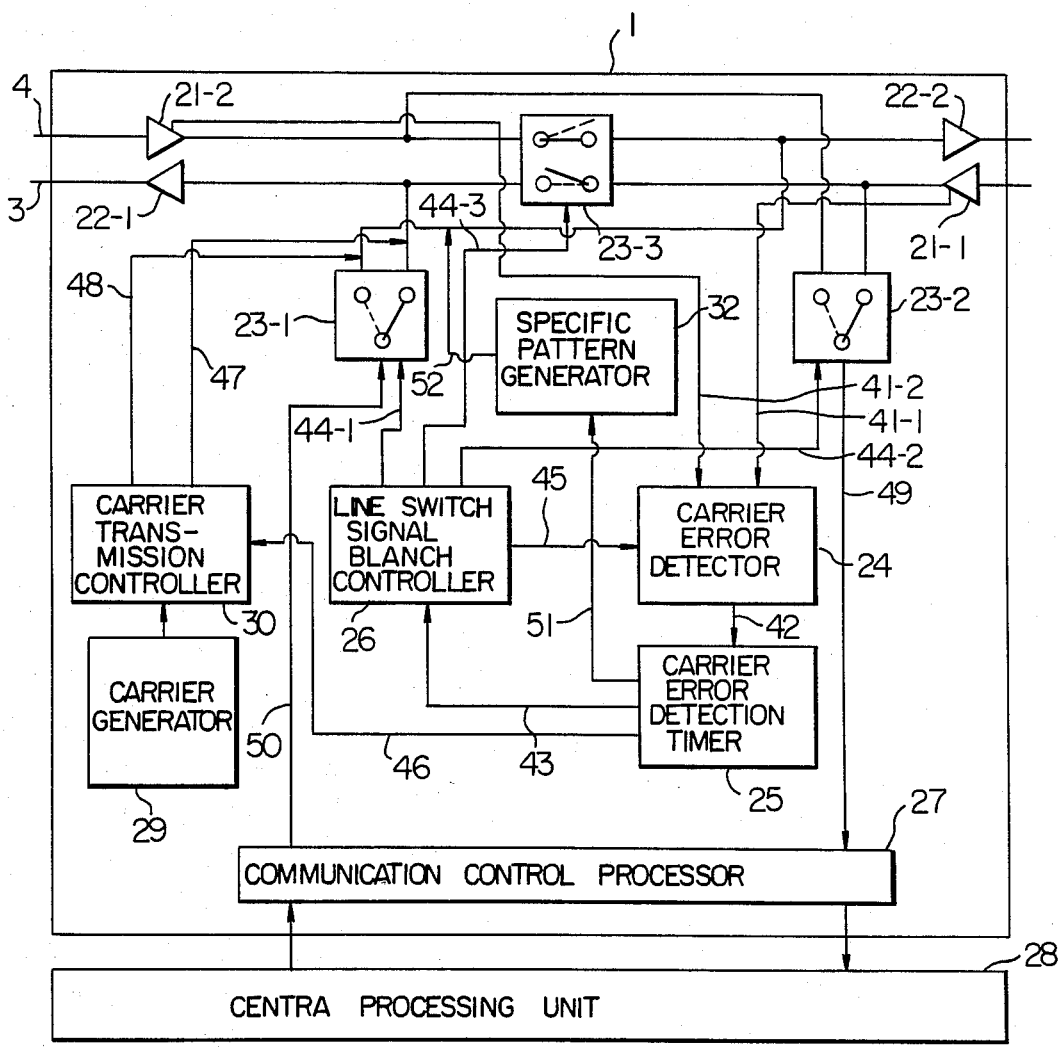
FIG. 5 is a diagram showing another embodiment of the particular arrangement of the master station shown in FIG. 1.

FIGS. 4 and 5 show other embodiments of the present invention, wherein the transmission line is switched conditionally, thereby preventing the line switching caused by a temporary disturbance of the carrier.

FIG. 4 shows another embodiment of the arrangement for the slave station 2. Upon receiving a switching signal from the carrier error detection timer 25, the line switch signal branch controller 26 operates to check, by a signal from a specific pattern detector whether there is the specific pattern sent from the master station 1 over the stand-by line 4. If there is no specific pattern on the stand-by line 4, it is determined to switch the overall transmission line as in the case of the previous embodiment. If there is the specific pattern on the stand-by line, it does not designate the switching of the overall transmission line. Instead, it is assumed that this station solely detects the carrier error, and switching of the transmission line is not carried out. This is based on the fact that the error detecting of the latter case can be caused by a temporary disturbance of the carrier.

FIG. 5 shows another embodiment of the arrangement for the master station 1. The carrier error detection timer 25 indicates the carrier error to the carrier transmission controller 30 and line switch signal branch controller 26 as well as to the specific pattern generator 32 through the signal line 51. In response to the carrier error indicating signal, the specific pattern generator 32 halts the transmission of the specific pattern for the signal line 52.

For the specific pattern, dot coded (binary) pattern data can be used.

As can be seen from the above description, the line switching of a specific slave station 2 caused by a temporary disturbance of the carrier can be prevented. Even in this case, however, the overall transmission line will be switched if the master station 1 detects a temporary disturbance of the carrier for a duration longer than the allowable period.

According to the present invention, as described above, each slave station is operable to detect the carrier error and to switch the transmission line, and the master station which transmits the carrier is operable to halt the transmission of the carrier, whereby the overall loop type transmission line can be switched to the stand-by line smoothly.

It will be appreciated that the foregoing transmission lines 3 and 4 are not fixed for use as active and stand-by lines, but they can be used in the opposite relationship.

We claim:

1. A method of switching loop type transmission lines for a transmission control system wherein a plurality of stations are linked by a transmission path including active and stand-by loop type transmission lines and wherein each station is normally connected to said active transmission line and a first station includes means for transmitting a carrier wave over at least said active one of said loop type transmission lines, the method comprising the steps of, in each of said terminal stations receiving said carrier wave from at least said active one of said transmission lines, detecting an abnormality in said carrier wave received through said active transmission line, re-transmitting said received carrier wave on said active transmission line when no abnormality is detected therein, switching the connection of the station to the transmission path from said active line to said stand-by line in response to the detection of an abnormality in said carrier wave, and in said first station, halting the transmission of said carrier wave on said active line in response to said detection of an abnormality so that occurrence of a fault in the active transmission line will result in all stations switching the connection of the station to the stand-by transmission line.

2. A method of switching loop type transmission lines according to claim 1, further including, in each of said stations, determining the state of said carrier wave as abnormal when said carrier input is absent for longer than a predetermined duration.

3. A method of switching loop type transmission lines according to claim 1 or 2, wherein, in each of said stations, the switching of transmission path from said active line to said stand-by line is effected only when said station has detected an abnormality in said carrier wave and a specific pattern is not transmitted over said stand-by line.

4. A transmission line switching system for a transmission control system including a plurality of stations and a transmission path including active and stand-by loop type transmission lines linking said stations, and wherein a first one of said plurality of stations is provided with transmission means for transmitting a carrier wave normally over both of said transmission lines, each of said stations being normally connected to said active transmission line and being provided with means for detecting an abnormality in said carrier wave through said active transmission line, means for re-transmitting a received carrier wave on said transmission line when no abnormality is detected, and means for switching the connection of the station to the transmission path from said active transmission line to said stand-by transmission line in response to the detection of said abnormality, said first station being provided with means for halting the transmission of said carrier wave on said active line in response to the detection of said abnormality, whereby occurrence of a fault in the active transmission line will result in all stations switching the connection of the station to the stand-by transmission line.

5. A transmission line switching system according to claim 4, wherein said detection means of each of said terminal stations includes means for determining that the state of said carrier wave is abnormal when said carrier input to the station is absent for longer than a predetermined duration.

6. A transmission line switching system according to claim 4 or 5, wherein each of said stations is further provided with means for detecting whether a specific pattern exists on said stand-by transmission line, and said switching means in each station includes means for switching the connection of the station from said active transmission line to said stand-by transmission line when an abnormality in said carrier wave has been detected and said specific pattern is not transmitted over said stand-by transmission line.

* * * * *